(12) United States Patent
Johnson et al.

(10) Patent No.: US 12,397,744 B2
(45) Date of Patent: Aug. 26, 2025

(54) THEFT PREVENTION SYSTEM AND METHOD

(71) Applicant: PACCAR Inc, Bellevue, WA (US)

(72) Inventors: Jason Robert Johnson, Anacortes, WA (US); Charles Wayne Reinhardt Swart, Bellingham, WA (US); Colter Timothy Creson, Bellingham, WA (US)

(73) Assignee: PACCAR Inc, Bellevue, WA (US)

( * ) Notice: Subject to any disclaimer, the term of this patent is extended or adjusted under 35 U.S.C. 154(b) by 132 days.

(21) Appl. No.: 18/363,606

(22) Filed: Aug. 1, 2023

(65) Prior Publication Data

US 2025/0042356 A1 Feb. 6, 2025

(51) Int. Cl.
*B60R 25/10* (2013.01)

(52) U.S. Cl.
CPC ........ *B60R 25/1001* (2013.01); *B60R 25/101* (2013.01)

(58) Field of Classification Search
CPC .......................... B60R 25/1001; B60R 25/101
See application file for complete search history.

(56) References Cited

U.S. PATENT DOCUMENTS

| | | | |
|---|---|---|---|
| 10,042,359 B1 * | 8/2018 | Konrardy | G08G 1/166 |
| 2018/0087948 A1 | 3/2018 | Khandelwal | |
| 2019/0176624 A1 * | 6/2019 | Powell | B60R 16/037 |
| 2021/0097315 A1 * | 4/2021 | Carruthers | G08B 13/19645 |
| 2023/0083504 A1 | 3/2023 | Burns et al. | |
| 2024/0409089 A1 * | 12/2024 | Xiao | G06V 20/58 |

FOREIGN PATENT DOCUMENTS

| | | |
|---|---|---|
| CN | 108275114 B | 6/2020 |
| CN | 111422057 A | 7/2020 |
| CN | 111768583 A | 10/2020 |
| CN | 111873787 A | 11/2020 |
| CN | 212148412 U | 12/2020 |

(Continued)

OTHER PUBLICATIONS

Extended European Search Report for European Patent Application No. 24183787.1 dated Dec. 11, 2024, 5 pages.

(Continued)

*Primary Examiner* — Nay Tun (57) ABSTRACT

A fuel theft prevention system for a vehicle including: at least one processor; and a memory, operatively connected to the at least one processor and storing instructions that, when executed by the at least one processor, cause the system to: receive, from a first sensing system, first activity data; determine, based on the first activity data, a first confidence value indicative of whether the activity is suspicious; receive fuel data indicative of a fuel level in the fuel tank; and cause, based on the first activity data and the fuel data, at least one mitigation action to be taken when the fuel level decreases by a threshold amount, wherein the threshold amount includes a first amount when the first confidence value is a first value and a second amount when the first confidence value is below the first value, and wherein the second amount is greater than the first amount.

10 Claims, 6 Drawing Sheets

(56) References Cited

FOREIGN PATENT DOCUMENTS

| DE | 10 2008 006308 A1 | 8/2008 |
|---|---|---|
| SE | 1 650 327 A1 | 9/2017 |

OTHER PUBLICATIONS

Website: Armstrong, "Tesla Sentry Mode: What it is, How to Use it and Battery Drain", Not a Tesla App, Jun. 30, 2023, 27 pages, (https://web.archive.org/web/20230630053329/https://www.notateslaapp.com/tesla-reference/1303/tesla-sentry-mode-what-it-is-how-to-use-it-and-battery-drain).

Website: "Preventing fuel thefts with an infrared curtain guard in Europe", Gurtam, dated May 30, 2023, 5 pages, (https://web.archive.org/web/20230530034319/https://gurtam.com/en/case-studies/fuel-theft-prevention-system).

Website: "How to Prevent Vehicle Fuel Theft", Imperial Shop Talk, dated Jun. 7, 2023, 4 pages, (https://web.archive.org/web/20230607093259/https://www.imperialsupplies.com/shop-talk/how-to-prevent-fuel-theft).

Website: "Fuel Theft Prevention", Bud and Tonys Truck Parts, Feb. 18, 2022, accessed Aug. 28, 2023, 4 pages, (https://budandtonystruckparts.com/blog/fuel-theft-prevention/).

Website: "Secure Your Vehicles at Rest Areas", Softsystems, Jan. 31, 2023, 20 pages, (https://web.archive.org/web/20230131202705/https://www.softsystems.ai/en/tguard/).

Website: "TankGuard—Truck Fuel Theft Alarm", Aide Automotive, Jan. 9, 2023, 4 pages, (https://web.archive.org/web/20230219234751/https://aideautomotive.com/products/tankguard-truck-fuel-theft-alarm/?term=7).

Website: "Fuel Theft Alarm Tank Guard for commercial Vehicle Fuel Tanks", Aide Automotive, accessed Aug. 28, 2023, 4 pages, (https://aideautomotive.com/products/fuel-theft-prevention-camera/).

Website: "Product Calipsa Pro Anayltics", Calipsa, dated Mar. 25, 2023, 7 pages, (https://web.archive.org/web/20230325021424/https://www.calipsa.io/product/calipsa-pro-analytics).

\* cited by examiner

THEFT PREVENTION SYSTEM AND METHOD

BACKGROUND

The present disclosure relates to systems and methods for preventing or deterring theft against vehicles, for example, theft of fuel from vehicles. Fuel theft from vehicles has long been a problem throughout the world due to the high cost of fuel, and such theft can result is substantial financial losses to, for example, truckers and fleet owners. Preventative measures, such as fuel cap locks and anti-siphon devices are insufficient to deter thieves, who can circumvent such measures by, for example, drilling a hole in a fuel tank and siphoning the fuel from the drilled hole. Accordingly, improvements in systems and methods for preventing fuel theft and other types of theft against vehicles is needed. This background section is provided merely for purposes of providing background information relating to the present disclosure and, thus, statements made in this background section do not constitute admissions of prior art.

SUMMARY

Nonlimiting and non-exhaustive examples of the present disclosure are described in this summary section, and additional details are described in the detailed description section.

In an aspect, the technology relates to a fluid theft prevention system for a vehicle, the fluid theft prevention system including: at least one processor; and a memory, operatively connected to the at least one processor and storing instructions that, when executed by the at least one processor, cause the system to perform a method, the method including: receiving, from a first sensing system, first activity data about activity near a fluid tank of the vehicle; determining, based on the first activity data, a first confidence value indicative of whether the activity is suspicious; receiving fluid data indicative of a fluid level in the fluid tank; and causing, based on the first activity data and the fluid data, at least one mitigation action to be taken when the fluid level decreases by a threshold amount, wherein the threshold amount includes a first amount when the first confidence value is a first value and a second amount when the first confidence value is below the first value, and wherein the second amount is greater than the first amount.

In an example, the first activity data includes data about motion detection or proximity detection near the fluid tank, and the first confidence value is indicative of whether the motion detection or proximity detection is suspicious. In another example, the first activity data includes data about whether motion has been detected near the fluid tank, and the first confidence value is determined to be the first value when any motion is determined to have been detected near the fluid tank. In another example, the first activity data includes video data or audio data of the activity near the fluid tank, and the determining the first confidence value includes at least one of: determining that a body near the fluid tank is a human; determining that an object near the fluid tank is a tool from among one or more predetermined tools; determining a distance between a body and the fluid tank; determining a period of time that a body is within a set region around the fluid tank; analyzing one or more body movement patterns of video data; analyzing one or more sound patterns of audio data; or determining whether a fluid cap is disengaged from the fluid tank. In another example, the first activity data includes video data, and the method further includes: receiving, from a second sensing system, data about motion detection near the fluid tank; determining, based on the data about the motion detection, a second confidence value indicative of whether the motion detection is suspicious; and turning on a camera of the first sensing system to obtain the video data when the second confidence value exceeds a second confidence threshold value. In another example, the at least one mitigation action includes at least one of: activating a sound horn of the vehicle; causing an alarm system to emit an alarm including sound or light; or transmitting an alert signal to a driver device, to a fleet manager system, or a security service system. In another example, the method further includes: causing a first mitigation action to be taken when the first confidence value exceeds a first confidence threshold value; and causing a second mitigation action to be taken when the fluid level decreases by the threshold amount, the second mitigation action being different than the first mitigation action. In another example, the fluid tank is a fuel tank.

In another aspect, the technology relates to a theft prevention system for a vehicle, the theft prevention system including: at least one processor; and a memory, operatively connected to the at least one processor and storing instructions that, when executed by the at least one processor, cause the system to perform a method, the method including: receiving, from a first sensing system, first activity data about activity within a region around the vehicle; receiving location information of a driver identity device; determining, based on the location information, whether the driver identity device is in proximity with the vehicle; and causing: at least one mitigation action to be taken when the first confidence value exceeds a first confidence threshold value and the driver identity device is not in proximity with the vehicle; and the at least one mitigation action to not be taken when the first confidence value exceeds the first confidence threshold value and the driver identity device is in proximity with the vehicle.

In an example, the first activity data includes data about motion detection or proximity detection within the region. In another example, the first activity data includes video data or audio data of the activity within the region. In another example, the at least one mitigation action includes at least one of: activating a sound horn of the vehicle; causing an alarm system to emit an alarm including sound or light; or transmitting an alert signal to a driver controller, to a fleet manager device, or to a security service device. In another example, the first activity data includes video data, and the method further includes: receiving, from a second sensing system, second activity data including data about motion detection or proximity detection within the region; determining, based on the second activity data, a second confidence value indicative of whether the motion detection or the proximity detection is suspicious; and causing a camera of the first sensing system to begin obtaining the video data when the second confidence value exceeds a second confidence threshold value. In another example, the at least one mitigation action includes a first mitigation action, and the method further includes causing: a second mitigation action to be taken when the second confidence value exceeds the second confidence threshold value and the driver identity device is not in proximity with the vehicle, the second mitigation action being different from the first mitigation action; and the second mitigation action to not be taken when the second confidence value exceeds the second confidence threshold value and the driver identity device is in proximity with the vehicle. In another example, the driver identity device includes a device configured to wirelessly emit a safe signal, and the determining whether the driver identity device is in proximity with the vehicle includes determining whether the theft prevention system has received the safe signal. In another example, the driver identity device includes a key, a key fob, a phone, or a driver controller. In another example, the region is a region around a fuel tank of the vehicle, around a diesel exhaust fluid container of the vehicle, or a cargo access area of the vehicle. In another example, the method further includes: receiving, from the vehicle, a vehicle start signal; causing a camera to obtain video data near a fuel tank of the vehicle when the vehicle start signal is received; determining, based on the video data, whether a fuel cap is disengaged from the fuel tank; and causing, when the fuel cap is determined to be disengaged from the fuel tank, an alert system to emit an alert signal.

In another aspect, the technology relates to fluid theft prevention system for a vehicle, the fluid theft prevention system including: at least one processor; and a memory, operatively connected to the at least one processor and storing instructions that, when executed by the at least one processor, cause the system to perform a method, the method including: receiving, from a sensing system, first activity data about activity near a fluid tank of the vehicle; determining, based on the first activity data, a first confidence value indicative of whether the activity is suspicious; receiving fluid data indicative of a fluid level in the fluid tank; receiving location information of a driver identity device; determining, based on the location information, whether the driver identity device is in proximity with the vehicle; causing: a first mitigation action to be taken when the first confidence value exceeds a first confidence threshold value and the driver identity device is not in proximity with the vehicle; and the at least one mitigation action to not be taken when the first confidence value exceeds the first confidence threshold value and the driver identity device is in proximity with the vehicle; and causing, based on the first activity data and the fluid data, a second mitigation action to be taken when the fluid level decreases by a threshold amount, the threshold amount includes a first amount when the first confidence value exceeds the first confidence threshold value and a second amount when the confidence value is below the first confidence threshold value, and wherein the second amount is more than the first amount.

In an example, the method includes causing: the second mitigation action to be taken when the fluid level decreases by the threshold amount and the driver identity device is not in proximity with the vehicle; and the second mitigation action to not be taken when the fluid level decreases by the threshold amount and the driver identity device is in proximity with the vehicle.

BRIEF DESCRIPTION OF THE DRAWINGS

The drawings depict nonlimiting and non-exhaustive examples of the present disclosure.

DETAILED DESCRIPTION

It will be understood that, although the terms "first", "second", "third", etc., may be used herein to describe various elements and features, these elements and features should not be limited by these terms. These terms are only used to distinguish one element or feature from another element or feature. Thus, a first element or feature discussed below could be termed a second element or feature, without departing from the spirit and scope of the present disclosure.

The terminology used herein is for the purpose of describing particular examples only and is not intended to be limiting of the present disclosure. As used herein, the singular forms "a", "an," and "the" are intended to include the plural forms as well, unless the context clearly indicates otherwise. It will be further understood that the terms "comprises," "comprising," "includes," and "including," when used in this specification, specify the presence of stated elements and/or features, but do not preclude the presence or addition of one or more other elements and/or features. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing examples of the present disclosure refers to "one or more examples of the present disclosure."

It will be understood that when an element is referred to as being "on" or "connected to" another element, it can be directly on or directly connected to the other element, or one or more intervening element(s) may be present. In contrast, when an element is referred to as being "directly on" or "directly connected to" another element, there are no intervening elements or layers present.

Also, any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

Nonlimiting and non-exhaustive examples of systems and methods for preventing or deterring theft against a vehicle will now be described with reference to the drawings.

Figure 1:
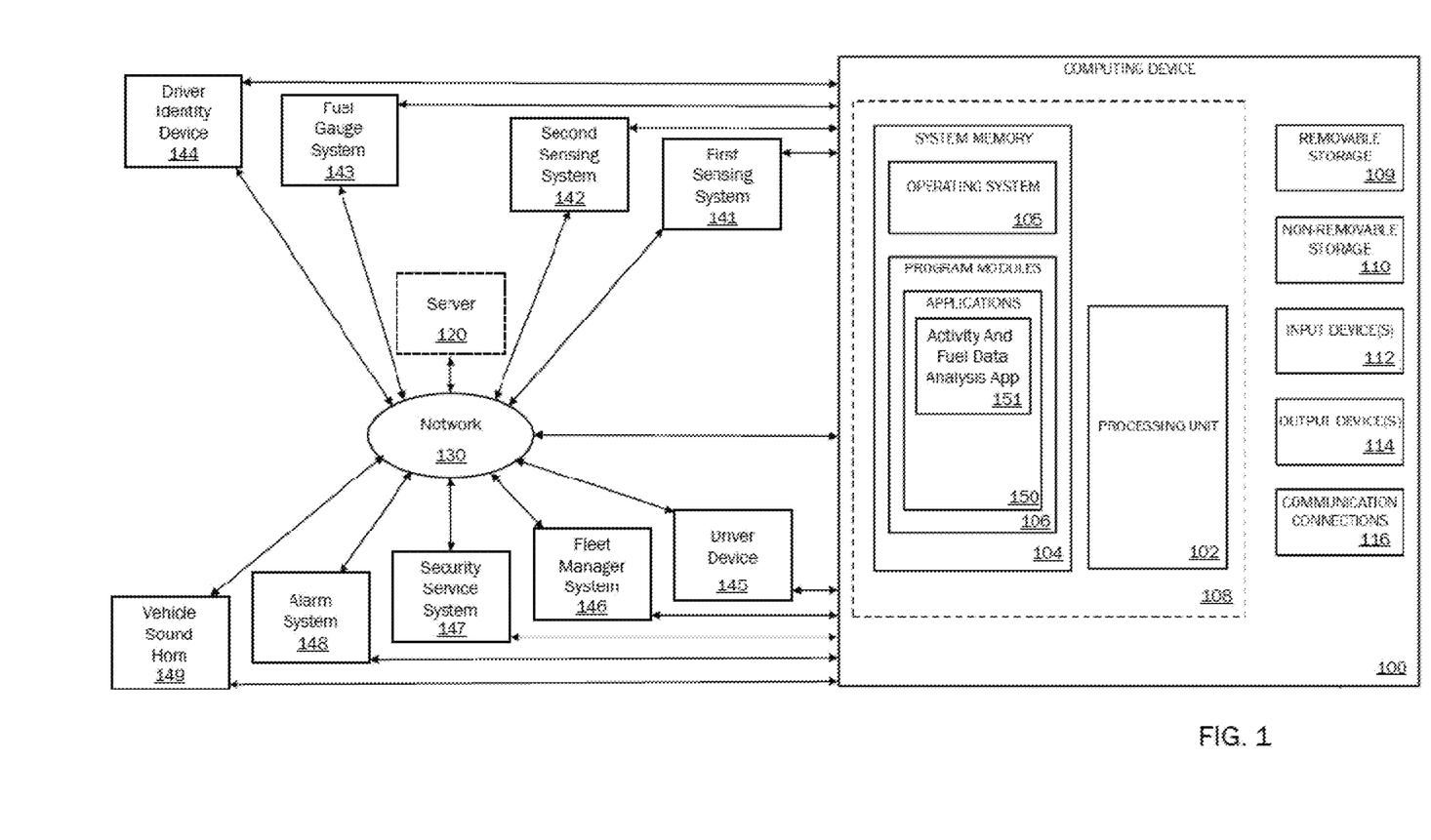
FIG. 1 depicts a block diagram of components of a theft prevention system according to some examples.
Figure 2:
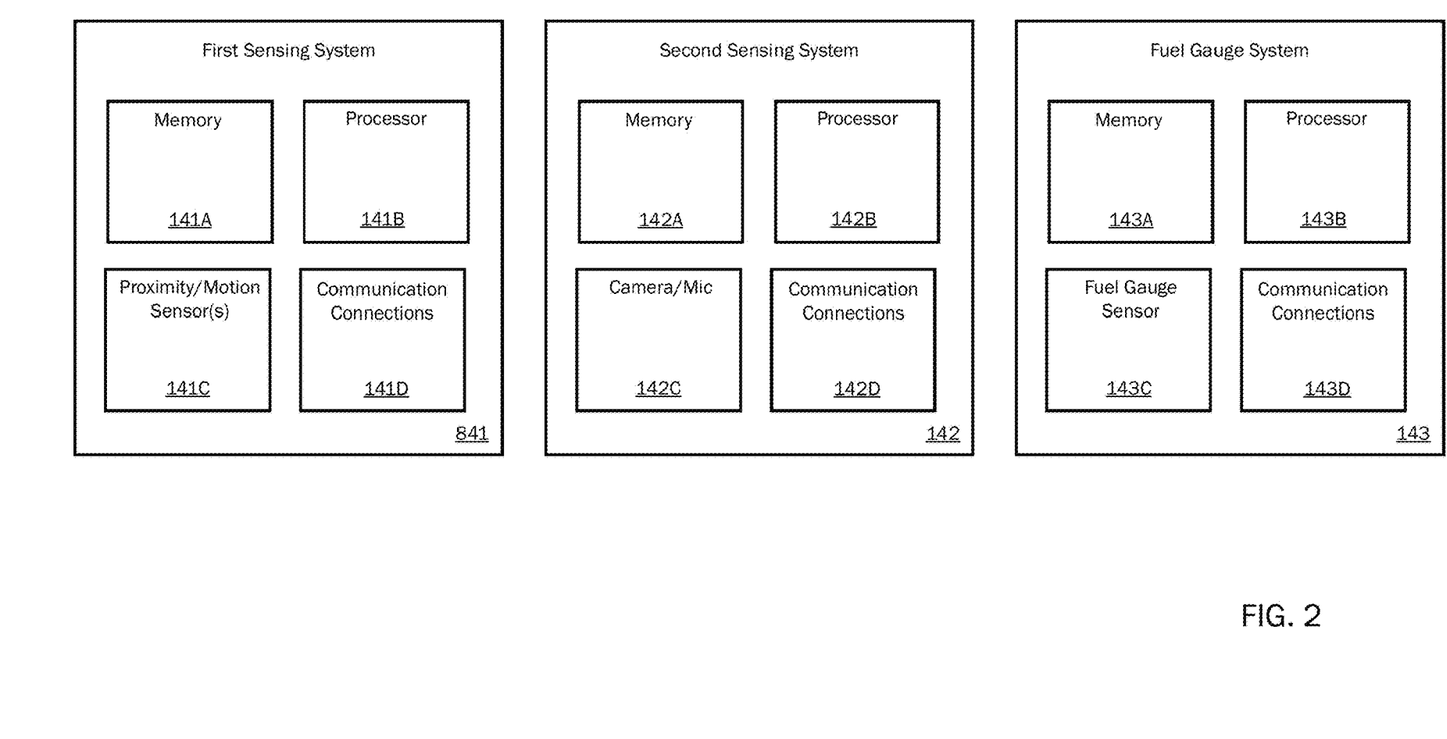
FIG. 2 depicts block diagrams of components of a first sensing system, components of a second sensing system, and components of a fuel gauge system of the theft prevention system of FIG. 1 according to some examples.
Figure 3:
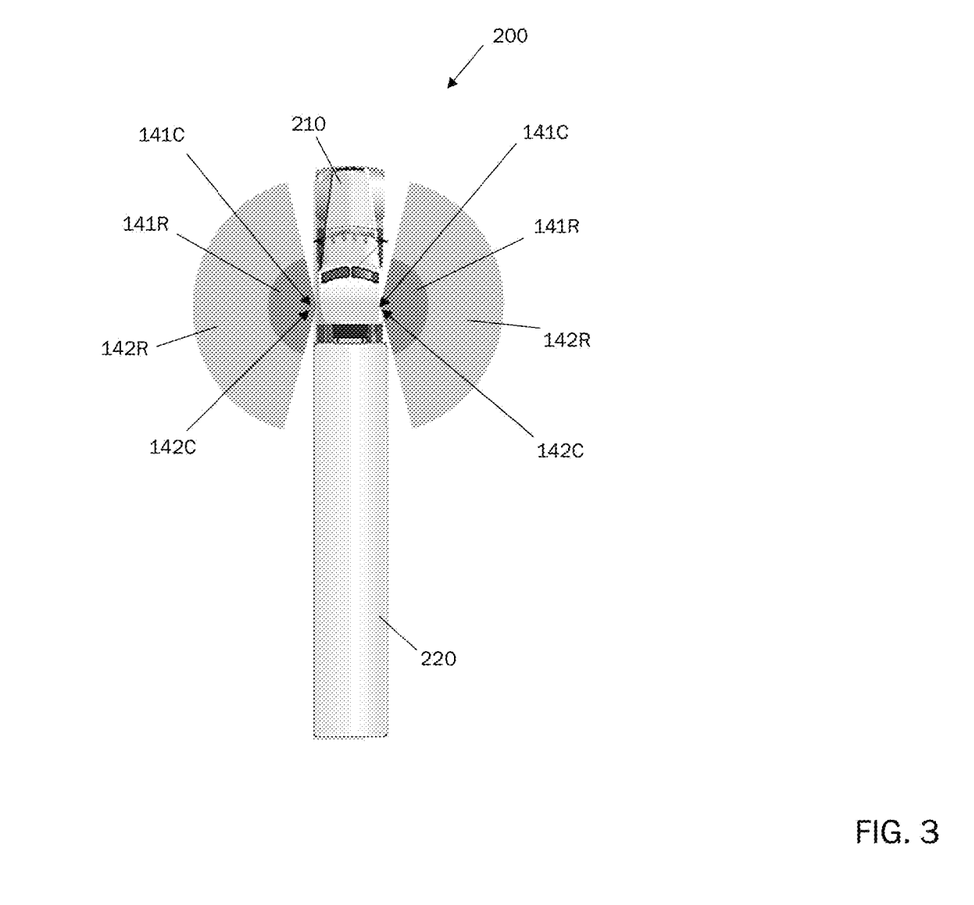
FIG. 3 depicts some features of the theft prevention system of FIG. 1 in use with a vehicle.
Figure 4:
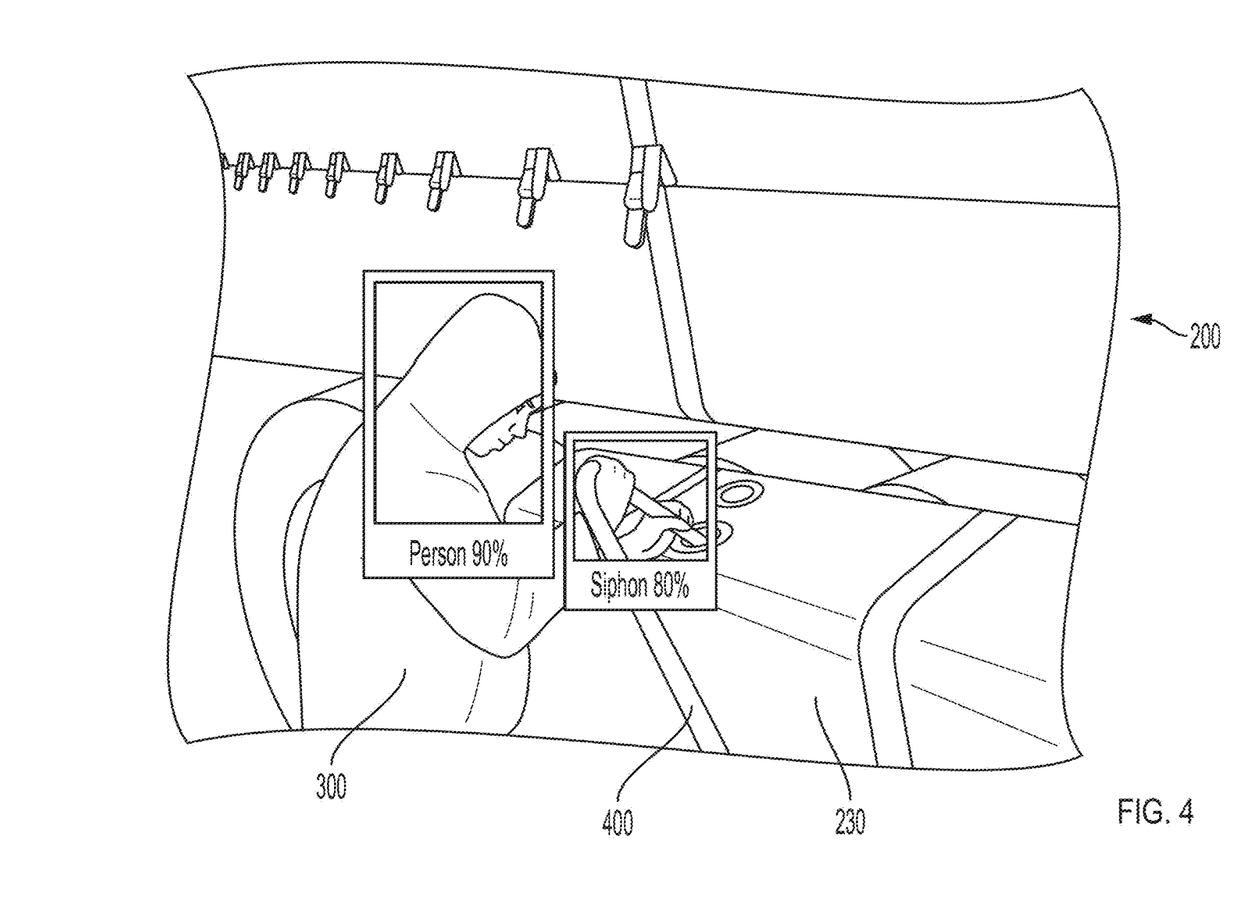
FIG. 4 depicts an example image taken by a camera of the theft prevention system of FIG. 1 according to some examples.

FIG. 1 depicts a block diagram illustrating components (e.g., hardware and software) of a theft prevention system for preventing or deterring theft against a vehicle. FIG. 2 depicts block diagrams of components of a first sensing system 141, components of a second sensing system 142, and components of a fuel gauge system 143 of the theft prevention system of FIG. 1 according to some examples. FIG. 3 depicts some features of the theft prevention system of FIG. 1 in use with a vehicle. FIG. 4 depicts an image taken by a camera of the theft prevention system of FIG. 1 according to some examples.

Referring concurrently to FIGS. 1-4, the vehicle with which the theft prevention system can be used may be, for example, a land-based, wheeled vehicle, such as a semi-truck. The theft prevention system may be used to prevent or deter theft of, for example, cargo, parts, or materials from the vehicle, such as fuel, diesel exhaust fluid, etc.

The system may include a computing device 100 that is communicatively connected to (e.g., configured to communicate to and/or from) and/or operatively connected to at least one of a first sensing system 141, a second sensing system 142, or a fuel gauge system 143. The computing device 100 may, in examples, comprise or be operatively connected to one or more vehicle control units of vehicle 200. The computing device 100 may also be communicatively connected to and/or operatively connected to at least one of a driver identity device 144, a driver device 145, a fleet manager system 146, a security service system 147, an alarm system 148, or a vehicle sound horn 149. The computing device 100 may be connected to the above components via, for example, a network 130, a wired connection, or a wireless connection, such a Bluetooth connection. The computing device 100 and the other components described above may be communicatively connected to a server 120, for example, via the network 130.

Generally, the first sensing system 141, the second sensing system 142, and the fuel gauge system 143 may be used to sense activity around the vehicle and sense fuel levels in a fuel tank of the vehicle, the computing device 100 (e.g., a processing unit 102 of the computing device 100) may analyze whether the sensed activity and fuel level changes are suspicious, and the alarm system 148 and the vehicle sound horn 149 may be used to emit alarms in response to determining that the sensed activity and/or fuel level changes are suspicious. The driver device 145, the fleet manager system 146, and the security service system 147 may include devices and systems that the computing device 100 is configured to send alert signals to in response to determining that the sensed activity and/or fuel level changes are suspicious. The driver identity device 144 may be a device that is indicative of where the driver of the vehicle is, and the location of the identity device 144 relative to the vehicle (or to the fuel tank or another specific part of the vehicle or a specific region around the vehicle) may be a factor in determining whether the activity around the vehicle is suspicious and/or whether to emit the alarms and/or transmit the alert signals.

The computing device 100, the first sensing system 141, the second sensing system 142, the fuel gauge system 143, the alarm system 148, and the vehicle sound horn 149 may be installed on (e.g., attached to or integrated with) the vehicle 200, while the driver identity device 144, the driver device 145, the fleet manager system 146, and the security system 147 may be detached or detachable from the vehicle. Additional details of the computing device 100 and the other components of the theft prevention system described above will be described in more detail below according to non-limiting and non-exhaustive examples.

The computing device 100 may be any computing device suitable to be used in the system for communicating with and/or operatively controlling the above-described components of the theft prevention system. For example, the computing device 100 may include a computer installed in the vehicle and configured to be in communication with one or more of the above-described components and/or configured to operatively control one or more of the above-described components.

In a basic configuration, the computing device 100 may include at least one processing unit 102 (e.g., at least one processor) and a system memory 104. Depending on the configuration and type of computing device, the system memory 104 may comprise, but is not limited to, volatile storage (e.g., random access memory), non-volatile storage (e.g., read-only memory), flash memory, or any combination of such memories. The system memory 104 may include an operating system 105 and one or more program modules 106 suitable for running software applications 150 such as activity and fuel data analysis applications 151. The activity and fuel data analysis applications 151 may include instructions (e.g., computer-readable instructions) that, when executed by the processing unit 102, cause the system to perform operations and processes described herein. The operating system 105, for example, may be suitable for controlling at least some operations of the computing device 100 and/or at least some operations of at least one of the first sensing system 141, the second sensing system 142, the fuel gauge system 143, the driver identity device 144, the driver device 145, the fleet manager system 146, the security service system 147, the alarm system 148, or the vehicle sound horn 149. Furthermore, aspects of the present disclosure may be practiced in conjunction with a graphics library, other operating systems, or any other application program and is not limited to any particular application or system. This basic configuration is illustrated in FIG. 1 by those components within a dashed line 108. The computing device 100 may have additional features or functionalities. For example, the computing device 100 may also include additional data storage devices (removable and/or non-removable) such as, for example, magnetic disks, optical disks, or tape. Such additional storage is illustrated in FIG. 1 by a removable storage device 109 and a non-removable storage device 110.

As stated above, a number of program modules and data files may be stored in the system memory 104. While executing on the processing unit 102, the program modules 106 may perform processes including, but not limited to, one or more of the stages or operations of the methods described herein or otherwise within the scope of the present disclosure. Other program modules that may be used in accordance with examples of the present disclosure and may include applications such as electronic mail and contacts applications, word processing applications, spreadsheet applications, database applications, slide presentation applications, drawing or computer-aided application programs, etc.

Furthermore, examples of the present disclosure may be practiced in an electrical circuit comprising discrete electronic elements, packaged or integrated electronic chips containing logic gates, a circuit utilizing a microprocessor, or on a single chip containing electronic elements or microprocessors. For example, example embodiments may be practiced via a system-on-a-chip (SOC) where each or many of the components of the computing device 100 illustrated in FIG. 1 may be integrated onto a single integrated circuit. Such a SOC device may include one or more processing units, graphics units, communications units, system virtualization units and various application functionality all of which are integrated (or "burned") onto the chip substrate as a single integrated circuit. Examples of the present disclosure may also be practiced using other technologies capable of performing logical operations such as, for example, AND, OR, and NOT, including but not limited to mechanical, optical, fluidic, and quantum technologies. In addition, aspects of the present disclosure may be practiced within a computer or in any other circuits or systems.

The computing device 100 may also have one or more input device(s) 112 such as a keyboard, a mouse, a pen, a sound input device, a touch input device, etc. The computing device 100 may include a display and may also include other output device(s) 114 such as speakers, a printer, etc. The aforementioned devices are examples and others may be used. The computing device 100 may include one or more communication connections 116 allowing communications with other computing devices and/or with at least one of the first sensing system 141, the second sensing system 142, the fuel gauge system 143, the driver identity device 144, the driver device 145, the fleet manager system 146, the security service system 147, the alarm system 148, the vehicle sound horn 149, or the network 130. For example, referring to FIG. 2, the computing device 100 may communicate with the first sensing system 141, the second sensing system 142, and the fuel gauge system 143 via the communication connections 141D, 142D, and 143D, respectively of the first sensing system 141, the second sensing system 142, and the fuel gauge system 143. The computing device 100 may also communicate with the driver identity device 144, the driver device 145, the fleet manager system 146, the security service system 147, the alarm system 148, and/or the vehicle sound horn 149 via communication connections in these components. Examples of suitable communication connections include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 104, the removable storage device 109, and the non-removable storage device 110 may all be computer storage media examples (i.e., memory storage.) Computer storage media may include RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 100. Any such computer storage media may be part of the computing device 100. In some examples, computer storage media is tangible and non-transitory and does not include a carrier wave or other propagated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Referring to FIG. 2, the first sensing system 141 may include at least one processor 141B, a memory 141A, one or more first sensors 141C and the communication connections 141D. The one or more first sensors 141C may be operatively controlled, for example, by the at least one processor 141B (when executing computer-readable instructions stored in the memory 141A) or by the computing system 100 (e.g., by the processing unit 102 when executing computer-readable instructions stored in the system memory 104), and may be configured to sense first activity data within a first region around the vehicle. The first region may be a first region near a fuel tank, of a cargo access point, etc. In some examples, the one or more first sensors 141C include a motion sensor configured to sense (e.g., detect) motion within the first region and/or a proximity sensor configured to sense (e.g., detect) the presence of a body within the first region. The first activity data may include information about motion detection (e.g., whether motion has been detected, a time duration during which motion was detected, where the motion was detected within the first region, etc.) and/or about proximity detection (e.g., whether a body has been detected within the first region, where the body has been detected within the first region, a distance between the body and a fuel tank, etc.). The first sensing system 141 may be configured to transmit, via the communication connections 141D, the first activity data to the computing device 100. In some examples, the first sensing system 141 is configured to process (e.g., analyze), via the at least one processor 141B when executing computer-readable instructions stored in the memory 141A, the first activity data and to transmit analytics about the first activity data to the computing device 100.

The second sensing system 142 may include a memory 142A, at least one processor 142B, one or more second sensors 142C, and the communication connections 142D. The one or more second sensors 142C may be operatively controlled, for example, by the at least one processor 142B (when executing computer-readable instructions stored in the memory 142A) or by the computing system 100 (e.g., by the processing unit 102 when executing computer-readable instructions stored in the system memory 104), and may be configured to sense second activity data within a second region around the vehicle. The second region may be the same as, or different from, the first region. For example, the second region may larger or smaller than the first region, and may overlap at least part (part or all) of the first region. In some examples, the one or more second sensors 142C include a camera configured to take images (e.g., discrete images or video data) and/or a microphone configured to obtain audio data. The second activity data may include, for example, still images, video data, and/or audio data within the second region. The second sensing system 142 may be configured to transmit, via the communication connections 142D, the second activity data to the computing device 100. In some examples, the second sensing system 142 is configured to process (e.g., analyze), via the at least one processor 142B when executing computer-readable instructions stored in the memory 142A, the second activity data and to transmit analytics about the second activity data to the computing device 100.

The fuel gauge system 143 may include a memory 143A, at least one processor 143B, a fuel gauge sensor 143C, and the communication connections 143D. The fuel gauge sensor 143C may be operatively controlled, for example, by the at least one processor 143B (when executing computer-readable instructions stored in the memory 143A) or by the computing system 100 (e.g., by the processing unit 102 when executing computer-readable instructions stored in the system memory 104), and may be configured to sense (e.g., measure) a fuel level in a fuel tank of the vehicle. The fuel gauge system 143 may be configured to transmit, via the communication connections 143D, the measured fuel levels to the computing device 100. In some examples, the fuel gauge system 143 is configured to process (e.g., analyze), via the at least one processor 143B when executing computer-readable instructions stored in the memory 143A, the measured fuel levels and to transmit analytics about the measured fuel levels (e.g., a change in fuel level over a set period of time) to the computing device 100.

In some examples, the one or more first sensors 141C of the first sensing system is activated (e.g., turned on) in response to a set event, such as in response to the vehicle being turned off or in response to receiving (e.g., by the computing device 100) an activation signal from the driver device 145 or through the input device 112. The one or more first sensors 141C may continuously monitor for activity (e.g., motion detection and/or proximity detection) within the first region, and collect first activity data about the activity. The processing unit 102 and/or the at least one processor 141B may be configured (when executing instructions stored in memory) to analyze the first activity data to determine a first confidence value regarding whether the activity within the first region is suspicious. In some examples, factors in the analysis of whether the activity within the first region is suspicious include at least one of whether motion is detected, where the motion is detected within the first region, for how long motion within the first region is detected, whether the presence of a body is detected within the first region, where the body is detected within the first region, for how long the body is detected to be within the first region, or whether the body is getting closer to a set component or part of the vehicle (e.g., fuel tank, diesel exhaust fluid container, cargo access area, etc.). The first confidence value may be a percentage value within a range, such as a range of 0% to 100%. Other measures or expressions of a confidence value are possible and anticipated.

The detection of motion within the first region may increase the first confidence value. Motion detected closer to a set object or part of the vehicle (e.g., the fuel tank) may increase the first confidence value compared to motion detected farther away from the object. Detecting motion within the first region for a period of time exceeding a threshold time period may increase the first confidence value, as it could indicate loitering instead of a passerby. Detecting the presence (proximity) of a body within the first region may increase the first confidence value. Determining that the body is close to the set object or part of the vehicle may increase the first confidence value compared to determining that the body is farther away from the object. Determining that the body is getting closer to the object or part may increase the first confidence value compared to if the body is getting farther away from the object or part.

The one or more second sensors 142C of the second sensing system 142 may be activated or turned on (e.g., by the processing unit 102 when executing instructions stored in the system memory 104) in response to the first confidence value exceeding a first confidence threshold value. For example, in response to determining that the first confidence value exceeds the first threshold value, the processing unit 102 (when executing instructions stored in the system memory 104) may cause a camera of the second sensing system 142 to begin collecting image data (e.g., taking still images or recording video data) and/or may cause a microphone of the second sensing system 142 to begin recording audio data. In some examples, the first confidence value exceeds the first confidence threshold value in response to determining that any motion or any presence of a body has been detected within the first region. Because the one or more second sensors 142C of the second sensing system 142 may require more power for operation than the one or more first sensors 141C of the first sensing system 141, activating the one or more second sensors 142C of the second sensing system 142 for only part of the time (e.g., only after the first confidence value exceeds the first confidence value threshold) may improve power efficiency of the theft prevention system.

In some examples, the computing device 100 (e.g., via the processing unit 102 executing instructions stored in the system memory 104) may cause at least one first mitigation action to be taken in response to the first confidence value exceeding the first confidence threshold value. The at least one first mitigation action may include activating the sound horn 149 to emit an alarm sound, causing the alarm system 148 to emit an alarm including sound and/or light outside of the vehicle, or transmitting an alert signal to at least one of the driver device 145, the fleet manager system 146, or the security service system 147. For example, the alarm system 148 may include light fixtures and speakers attached to the outside of the vehicle and configured to emit light and sound. The driver device 145 may be a device through which the driver of the vehicle may receive from, and provide communications to, the computing device 100. For example, the driver device 145 may be a phone, a laptop, a pager, a smartwatch, a controller, etc. The driver may be prompted to return to his vehicle upon receiving the alert signal, to call authorities, etc. in order to prevent or deter ongoing or imminent theft against the vehicle. The fleet manager system 146 may be a system utilized by a fleet manager to monitor a fleet of vehicles under the fleet manager's management, including the vehicle on which the computing device 100 is installed. The fleet manager may be prompted to take suitable action in response to receiving alert signals from the computing device 100. The security service system 147 may be a system utilized by a security service tasked with monitoring and protecting the vehicle. By alerting one or more of the driver, the fleet manager, and the security service when the first confidence value exceeds the first confidence value threshold, heightened monitoring and/or preventive action can be taken by various parties in addition to, or instead of, triggering alarms triggered by the computing device 100.

The second sensing system 142 may collect the second activity data (e.g., video data and/or audio data) within the second region after the one or more second sensors 142C are activated. The second activity data may be analyzed, for example, by the processing unit 102 or by the at least one processor 141B (when executing instructions stored in memory), to determine a second confidence value regarding whether the activity within the second region is suspicious. In some examples, factors in the analysis of whether the activity within the second region is suspicious include at least one of determining whether a body within the second region is a human, determining that an object within the second region is a tool from among one or more predetermined tools, determining a distance between a body within the second region and a set object or part of the vehicle (e.g., the fuel tank), determining a period of time that the body is within the second region, determining whether one or more body movements resemble a predetermined image pattern, determining whether one or more sound patterns resemble a predetermined sound pattern, or determining whether a fuel cap is disengaged from a fuel tank of vehicle. The second confidence value may be a percentage value within a range, such as from 0% to 100%. Other measures or expressions of a confidence value are possible and anticipated. In some examples, the second confidence value is based in part on the first confidence value. For example, determining the second confidence value may include initially setting the second confidence value to be equal to the first confidence value, and then adjusting the initial second confidence value based on the second activity data.

Determining that a body is a human may increase the second confidence value compared to if it is determined that the body is, for example, an animal (e.g., a dog passing by). Determining that an object within the second region is a tool from among one or more predetermined tools (e.g., tools commonly used for stealing fuel, such as a drill, a siphon, etc.) may increase the second confidence value. The second confidence value may increase according to an inverse relationship with a distance between the body and the part of the vehicle in interest. Determining that the body has been within the second region for more than a threshold time period may indicate loitering and, thus, may increase the second confidence value. Determining that one or more body movements by the body resemble certain movement patterns may increase the second confidence value. The certain movement patterns may include patterns commonly associated with theft, such as reaching for the fuel cap of a fuel tank, positioning an object against the fuel tank, etc. Determining that one or more sound patterns resemble certain sound patterns may increase the second confidence value. The certain sound patterns may include patterns commonly associated with theft, such as a drilling noise, which may indicate an attempt to pierce a fuel tank. Determining that a fuel cap of a fuel tank is disengaged from the fuel tank may also increase the second confidence value.

In some examples, the computing device 100 (e.g., via the processing unit 102 executing instructions stored in the system memory 104) may cause at least one second mitigation action to be taken in response to the second confidence value exceeding a second confidence threshold value. The at least one second mitigation action may include activating the sound horn 149 to emit an alarm sound, causing the alarm system 148 to emit an alarm including at least one of sound or light outside of the vehicle, or transmitting an alert signal to at least one of the driver device 145, the fleet manager system 146, or the security service system 147.

In some examples, the at least one second mitigation action may be different and more severe than the at least one first mitigation action. For example, the computing device 100 may cause a first mitigation action to be taken in response to the first confidence value exceeding the first confidence threshold value, and may cause a second mitigation action to be taken in response to the second confidence value exceeding the second confidence threshold value. The second mitigation action may be the same as, or different from, the first mitigation action. For example, the first and second mitigation actions may respectively include a first alarm and a second alarm different from the first alarm. In some examples, the first alarm may include a light that the alarm system 148 shines upon the first region, and the second alarm may include a siren emitted by the alarm system 148. By tiering the alarm process, for example, to emit a more subtle alarm (e.g., a steady light) when mere motion is detected around the fuel tank and then to emit a more jarring alarm (e.g., strobing light and/or a loud siren) when a higher degree of suspicion is justified, the alarm system can effectively deter nonthreats and some potential threats without resorting to severe alarms that may needlessly disturb the surrounding area. Similarly, a first alert signal may be transmitted when the first confidence value exceeds the first confidence threshold value, and a second alert signal different from the first alert signal may be transmitted when the second confidence value exceeds the second confidence threshold value. The second alert signal may be more urgent than the first alert signal.

The motion sensor and/or the proximity sensor of the first sensing system 141 may continue to collect the first activity data while the camera and/or the microphone of the second sensing system 142 are turned on. The processing unit 102 may be configured (when executing instructions stored in memory) to turn off the camera and/or the microphone under certain conditions, for example, after a certain time period has passed and the second confidence value has not exceeded the second confidence threshold value, after determining that the activity within the second region is not a threat, after a set period of time passes after the motion sensor and/or the proximity sensor cease to detect motion and/or proximity within the first region, etc. By turning off the camera and/or the microphone under the certain circumstances, power usage can be reduced and efficiency of the theft prevention system can be improved.

The fuel gauge system 143 may collect, by the fuel gauge sensor 143C, fuel levels of fuel within a fuel tank of the vehicle. The measured fuel levels may be analyzed, for example, by the processing unit 102 or by the at least one processor 143B (when executing instructions stored in memory), to determine whether the fuel levels have decreased by a threshold amount. When the threshold amount is exceeded, the computing device 100 (e.g., via the processing unit 102 executing instructions stored in the system memory 104) may cause at least one third mitigation action to be taken. The at least one third mitigation action may include activating the sound horn 149 to emit an alarm sound, causing the alarm system 148 to emit an alarm including at least one of sound or light outside of the vehicle, or transmitting an alert signal to at least one of the driver device 145, the fleet manager system 146, or the security service system 147.

The threshold amount may be an amount that indicates that fuel is actively being removed from the fuel tank. Because fuel levels may decrease while the vehicle is moving or performing other operations, the measured fuel levels may be analyzed under set conditions, such as when the vehicle is not moving, or when the vehicle's engine is turned off. The threshold amount may depend on (e.g., may vary according to) the first activity data and/or the second activity data, for example, based on analytics of the first activity data and/or analytics of the second activity data. For example, the threshold amount may have an inverse-type relationship with the first and/or second confidence values. Because fuel levels may vary to some extent randomly over time, some tolerance for transient measurements of decreases in fuel levels can be desirable to avoid false alarms and/or false alert signals. By setting the threshold amount higher when activity around the fuel tank is lower, such false alarms and false alerts can be prevented or rendered less likely. On the other hand, by setting the threshold amount lower when the activity around the fuel tank is higher (e.g., when the first confidence value is higher and/or when the second confidence value is higher), mitigation actions can be more quickly triggered to stop fuel theft, alert the driver and/or authorities, etc. when it is more likely to be needed.

In some examples, the threshold amount includes (e.g., is) a first amount when the first confidence value is a first value, and the threshold amount includes a second amount greater than the first amount when the first confidence value is less than the first value. In some examples, the threshold amount includes a third amount when the second confidence value is a second value, and the threshold amount includes a fourth amount greater than the third amount when the second confidence value is less than the second value. For example, the fuel gauge system 143 and the second sensing system 142 may be used without the first sensing system 141, or the fuel gauge system 143 and the first sensing system 141 may be used without the second sensing system 142. In some other examples, the fuel gauge system 143 is used together with both the first and second sensing systems 141 and 142. For example, the threshold amount may depend on both the first and second confidence values.

In some examples, the processing unit 102 may be configured, when executing instructions stored in the system memory 104, to cause a first mitigation action to be taken (e.g., a first alarm to be emitted and/or a first alert signal to be transmitted) when the first confidence value exceeds the first confidence threshold value, to cause a second mitigation action to be taken (e.g., a second alarm to be emitted and/or a second alert signal to be transmitted) when the second confidence value exceeds the second confidence threshold value, and to cause a third mitigation action to be taken (e.g., a third alarm to be emitted and/or a third alert signal to be transmitted) when the fuel level decreases by the threshold amount. As explained above, it may be desirable to tier the severity of the alarms emitted and/or of the alert signals transmitted.

The computing device 100 may receive location information of the driver identity device 144 (e.g., directly from the driver identity device 144 or from an intermediate device or system) and may be configured to take one or more mitigation actions based at least in part on whether the driver identity device 144 is determined to be within proximity of the vehicle or to a specific part (e.g., fuel tank) of the vehicle or a specific region around the vehicle (e.g., within a set range therefrom, such as within 1,000 feet, 500 feet, 200 feet, 100 feet, or 50 feet). For example, the location information of the driver identity device 144 may be a factor in determining the first confidence value, the second confidence value, and/or the threshold amount of the fuel level decrease. The location information of the driver identity device 144 may indicate whether the driver is close to the vehicle or far away from the vehicle. Therefore, the location information may indicate whether the activity around the vehicle sensed by the first sensing system 141 and/or the second sensing system 142 is activity of the driver or something or someone other than the driver, and whether fuel decreases sensed by the fuel gauge system 143 is caused by the driver or something or someone other than the driver. Utilizing the location information of the driver identity device 144 may therefore avoid, or reduce the likelihood, of false alarms and false alert signals that are triggered by the driver.

In some examples, the processing unit 102 is configured (when executing instructions stored in the system memory 104) to cause the at least one first mitigation action to be taken when the first confidence value exceeds the first confidence threshold value and the driver identity device is determined to not be in proximity with the vehicle (or with a specific part of or region around the vehicle, such as the fuel tank), and may cause the at least one first mitigation action to not be taken when the driver identity device is determined to be within the proximity of the vehicle (or with a specific part of or region around the vehicle, such as the fuel tank), even if the first confidence value exceeds the first confidence threshold value.

In some examples, the processing unit 102 is configured (when executing instructions stored in the system memory 104) to cause the at least one second mitigation action to be taken when the second confidence value exceeds the second confidence threshold value and the driver identity device is determined to not be in proximity with the vehicle (or with a specific part of or region around the vehicle, such as the fuel tank), and may cause the at least one second mitigation action to not be taken when the driver identity device is determined to be within the proximity of the vehicle (or with a specific part of or region around the vehicle, such as the fuel tank), even if the second confidence value exceeds the second confidence threshold value.

In some examples, the processing unit 102 is configured (when executing instructions stored in the system memory 104) to cause the at least one third mitigation action to be taken when the fuel level decreases by the threshold amount and the driver identity device is determined to not be in proximity with the vehicle (or with a specific part of or region around the vehicle, such as the fuel tank), and may cause the at least one mitigation action to not be taken when the driver identity device is determined to be within the proximity of the vehicle (or with a specific part of or region around the vehicle, such as the fuel tank), even if the fuel level decreases by the threshold amount.

The driver identity device 144 may include a device configured to wirelessly emit a safe signal, and the computing device 100 may be configured to determine whether the driver identity device 144 is in proximity with the vehicle by determining whether the computing device 100 has received the safe signal. For example, the driver identity device 144 may be configured to wirelessly transmit the safe signal within a threshold range that is less than or equal to the defined proximity range around the vehicle, and the computing device 100 may determine, in response to determining that the safe signal has been received, that the driver identity device is within proximity with the vehicle.

In some examples, the driver identity device 144 includes a key, a key fob, a phone, or a mobile driver controller. In some examples, the driver identity device 144 is the driver device 145 (e.g., the driver identity device 144 is incorporated into, or forms a part of, the driver device 145).

In some examples, the computing device 100 may be configured to receive, from the vehicle, a vehicle start signal indicating, for example, that the vehicle's engine or batter have been turned on. The computing device 100 (e.g., via the processing unit 102 when executing instructions stored in the system memory 104) may be configured to turn on or activate a camera of the second sensing system 142 in response to receiving the vehicle start signal. The processing unit 102 may be configured (when executing instructions stored in memory) to determine, based on image or video data collected by the camera, whether a fuel cap is disengaged from the vehicle's fuel tank, and to cause an alarm to be emitted or an alert to be transmitted when the fuel cap is determined to be disengaged. For example, the computing device 100 may transmit an alarm or an alert signal to the driver's 5V beeper. This can prompt the driver to check his fuel tanks for undetected fuel theft before operating the vehicle.

Referring to FIG. 3, in some examples, the vehicle 200 may be a large truck, such as a Class 8 truck. However, the present methods and systems can be used by vehicles 200 of different types and/or sizes. For instance, aspects of the disclosed subject matter may have wide application and, therefore, may be suitable for use with other types of vehicles, such as passenger vehicles, buses, light, medium, and heavy-duty vehicles, motor homes, etc. Accordingly, the following descriptions and illustrations herein should be considered illustrative in nature and, thus, not limiting of the scope of the claimed subject matter. In some examples, the vehicle 200 comprises a truck (or tractor) 210 articulatedly connected to a trailer 220, such as, for example, a "fifth wheel", to form a tractor-trailer combination as depicted in 3. The one or more first sensors 141C (e.g., the motion and/or proximity detection sensors) may be installed (e.g., attached to or integrated with) on the truck 210 and/or the one or more second sensors 142C (e.g., the camera and/or the microphone) may be installed on (e.g., attached to or integrated with) the truck 210. Because a truck driver may transport different trailers 220, installing the one or more first sensors 141C and/or the one or more second sensors 142C on the truck 210 (instead of on the trailer 220) can eliminate the need to uninstall and re-install these components of the theft prevention system on the trailer 220 every time one trailer is dropped off and a different trailer is picked up. However, the present disclosure is not limited thereto. For example, the one or more first sensors 141C and/or the one or more second sensors 142 may be installed on (e.g., attached onto or integrated into) the trailer 220, which can enable the one or more first sensors 141C and the one or more second sensors 142C to respectively monitor regions that they could not have monitored (or could not have monitored as completely or precisely) while attached to the truck 210.

In some examples, the one or more first sensors 141C are positioned relatively high up on the vehicle 200 and angled downward towards the ground at a first angle such that the one or more first sensors 141C can monitor a first region 141R. The one or more second sensors 142C may be positioned relatively high up on the vehicle 200 and angled downwards towards the ground at a second angle such that the one or more second sensors 142C can monitor a second region 142R. By positioning the one or more first sensors 141C and the one or more second sensors 142C high up on the vehicle 200 (e.g., on an upper half, an upper quarter, or at a top of the truck 210), the risk of tampering or blocking the one or more first sensors 141C and the one or more second sensors 142C by a thief may be reduced or eliminated by placing these sensors in difficult to access locations.

In some examples, the first region 141R may be smaller than the second region 142R. For example, the first angle at which the one or more first sensors 141C are angled towards the ground may be smaller than the second angle at which the one or more second sensors 142C are angled towards the ground such that the first region 141R is smaller than the second region 142R. By setting the first region 141R to be smaller than the second region 142R, the first region may be more focused around the area of interest (e.g., around the fuel tank), which can reduce the likelihood of false alarms and/or false alert signals being triggered by activity around the vehicle. This can also reduce the power consumed by the at least one second sensors 142C (e.g., a camera and/or a microphone) by reducing the activation time of the one or more second sensors 142C.

FIG. 4 depicts an image captured by a camera of a theft prevention system as disclosed herein and illustrates a truck 200, a fuel tank 230 of the truck 200, a body 300, and an object 400. The body 300 and the object 400 are respectively a thief and a siphon being used by the thief to steal fuel from the fuel tank 230. FIG. 4 shows example confidence values generated by the computing device 100 that the body 300 is a human (90% confidence value) and that the object is a siphon (80% confidence value). Based on at least these confidence values, the computing device 100 may determine one or more confidence values regarding whether the activity of the body 300 is suspicious.

Methods for preventing theft against a vehicle will now be described with reference to FIGS. 5 and 6. The methods may be implemented or performed by any theft prevention systems disclosed herein, or otherwise within the scope of the present disclosure. Although certain methods are described herein, the present disclosure is not limited thereto. Rather, the present disclosure discloses various processes and operations of theft prevention systems, and those of ordinary skill in the art will recognize that the present disclosure includes theft prevention methods including performing any combination, and in any order, of these processes and operations.

Figure 5:
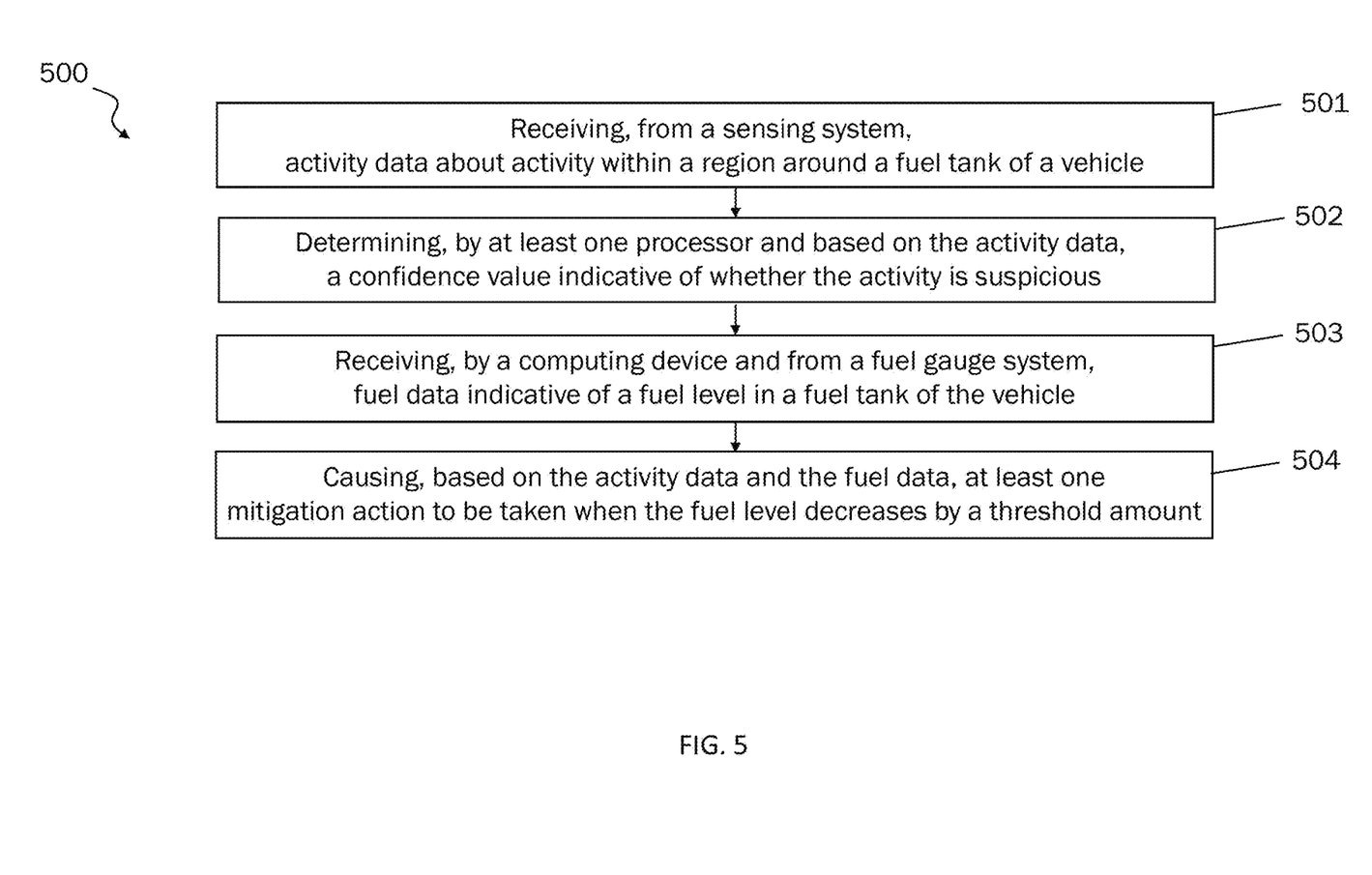
FIG. 5 depicts a flow chart of a theft prevention method according to some examples.

Referring to FIG. 5, a fuel theft prevention method 500 may include a first process 501 of receiving (e.g., by the computing device 100), from a sensing system, activity data about activity within a region around a fuel tank of a vehicle. The sensing system may be, for example, the first sensing system 141 or the second sensing system 142 described herein, and the activity data may be the first activity data or the second activity data, as described herein. The theft prevention method 500 may further include a second process 502 of determining, by at least one processor and based on the activity data, a confidence value indicative of whether the activity is suspicious. For example, the confidence value may be the first confidence value or the second confidence value, as described herein, and the confidence value may be determined in any manner that the first and second confidence values may respectively be determined. The theft prevention method 500 may further include a third process 503 of receiving, by the computing device and from a fuel gauge system, fuel data indicative of a fuel level in a fuel tank of the vehicle. The theft prevention method 500 may further include a fourth process 504 of causing, based on the activity data and the fuel data, at least one mitigation action to be taken when the fuel level decreases by a threshold amount. For example, the fuel threshold amount may include a first amount when the confidence value is a first value, and a second amount greater than the first amount when the confidence value is less than the first value.

Figure 6:
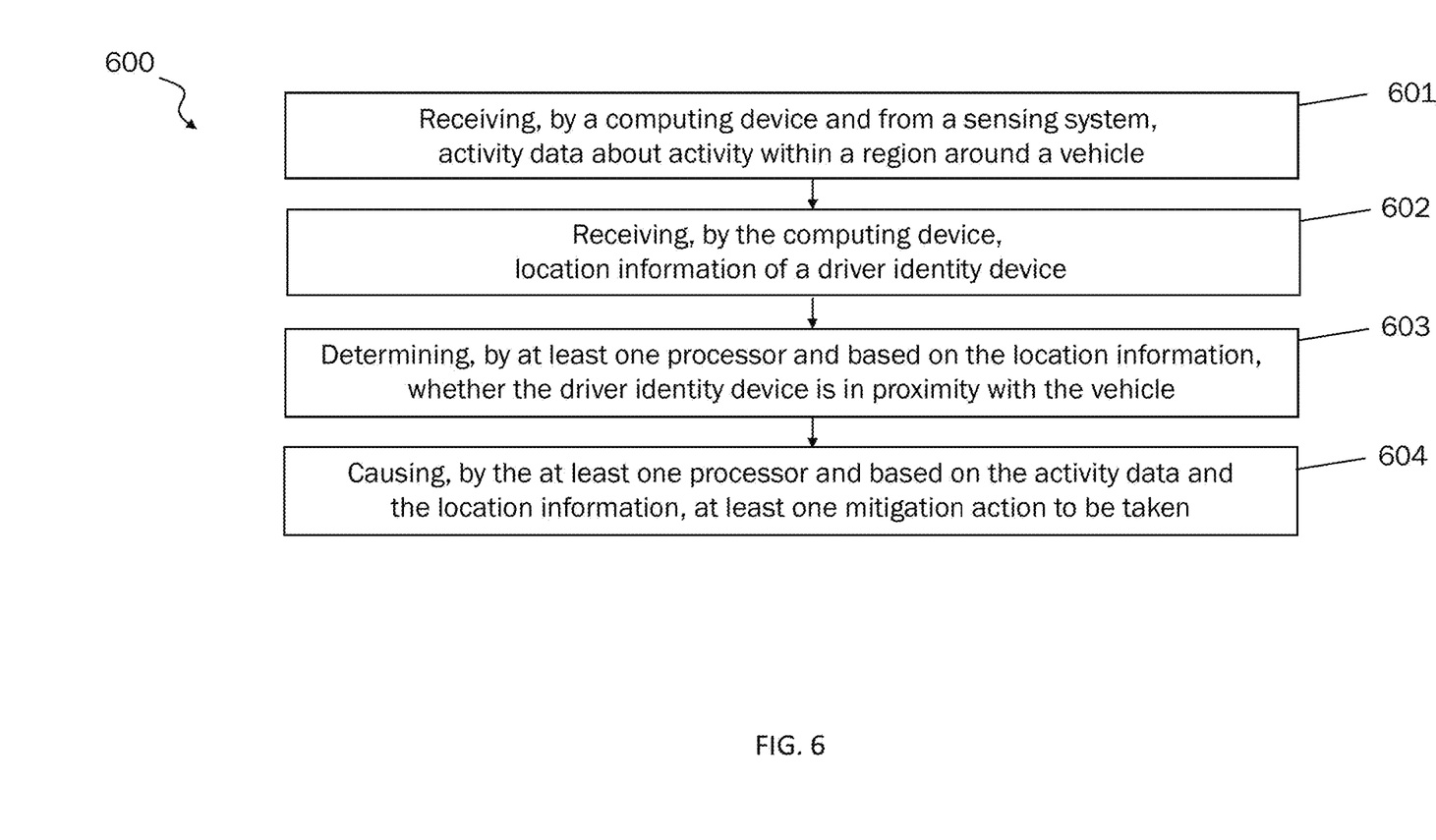
FIG. 6 depicts a flow chart of another theft prevention method according to some examples.

Referring to FIG. 6, a theft prevention method 600 may include a first process 601 of receiving, by a computing device and from a sensing system, activity data about activity within a region around a vehicle. The sensing system may be, for example, the first sensing system 141 or the second sensing system 142 described herein, and the activity data may be the first activity data or the second activity data, as described herein. The theft prevention method 600 may include a second process 602 of receiving, by the computing device, location information of a driver identity device. The theft prevention method 600 may include a third process 603 of determining, by at least one processor and based on the location information, whether the driver identity device is in proximity with the vehicle. For example, the at least one processor may determine a distance between the driver identity device and the vehicle and determine whether the distance is less than a proximity threshold value (e.g., 1,000 feet, 500 feet, 200 feet, 100 feet, 50 feet, or 10 feet). The theft prevention method 600 may include a fourth process 604 of causing, by the at least one processor and based on the activity data and the location information, at least one mitigation action to be taken. For example, the at least one processor may analyze the activity data and determine a confidence value as to whether the activity is suspicious. The at least one processor may cause the at least one mitigation action to be taken when the confidence value exceeds a confidence threshold value and the driver identity device is determined to not be in proximity with the vehicle, and to not cause the at least one mitigation action to be taken when the confidence value exceeds the confidence threshold value and the driver identity device is in proximity with the vehicle.

Although some theft prevention systems and methods described herein refer to preventing the theft of fuel (e.g., based on measured fuel levels, motion and/or activity near a fuel tank, and/or based on video data showing whether a cap of the fuel tank is disengaged from the fuel tank), the present disclosure is not limited thereto and may, for example, be applicable in a similar manner to preventing theft against other vehicle fluids, such as diesel exhaust fluid. For example, the vehicle may include a diesel exhaust fluid tank, and a theft prevention system may include a diesel exhaust fluid gauge system that is configured in a manner similar to how the fuel gauge system 143 may be configured. The processing unit 102 (when executing instructions stored in the system memory) may be configured to process and utilize measured diesel exhaust fluid levels, motion and/or activity near the diesel exhaust fluid tank, and/or video data showing whether a cap of the diesel exhaust fluid tank is disengaged from the diesel exhaust fluid tank in a manner similar to how the processing unit 102 may process and utilize similar information relating to the fuel tank and fuel levels therein. The processing unit 102 (when executing instructions stored in the system memory 104) may be configured to cause at least one mitigation action to be taken based on the measured diesel exhaust fluid levels, motion and/or activity near the diesel exhaust fluid tank, and/or video data showing whether a cap of the diesel exhaust fluid tank is disengaged from the diesel exhaust fluid tank in a manner similar to how the processing unit 102 may cause at least one mitigation action to be taken based on similar information relating to the fuel tank and fuel levels therein.

Although specific embodiments are described herein, the scope of the technology is not limited to those specific embodiments. Moreover, while different examples and embodiments may be described separately, such embodiments and examples may be combined with one another in implementing the technology described herein. One skilled in the art will recognize other embodiments or improvements that are within the scope and spirit of the present technology. Therefore, the specific structure, acts, or media are disclosed only as illustrative embodiments. The scope of the technology is defined by the following claims and any equivalents therein.

What is claimed is:

1. A fluid theft prevention system for a vehicle, the fluid theft prevention system comprising:
    at least one processor; and
    a memory, operatively connected to the at least one processor and storing instructions that, when executed by the at least one processor, cause the system to perform a method, the method comprising:
    receiving, from a first sensing system, first activity data about activity near a fluid tank of the vehicle;
    determining, based on the first activity data, a first confidence value indicative of whether the activity is suspicious;
    receiving fluid data indicative of a fluid level in the fluid tank; and
    causing, based on the first activity data and the fluid data, at least one mitigation action to be taken when the fluid level decreases by a threshold amount, wherein the threshold amount comprises a first amount when the first confidence value is a first value and a second amount when the first confidence value is below the first value, and wherein the second amount is greater than the first amount.

2. The fluid theft prevention system of claim 1, wherein the first activity data comprises data about motion detection or proximity detection near the fluid tank, and the first confidence value is indicative of whether the motion detection or proximity detection is suspicious.

3. The fluid theft prevention system of claim 2, wherein the first activity data comprises data about whether motion has been detected near the fluid tank, and the first confidence value is determined to be the first value when any motion is determined to have been detected near the fluid tank.

4. The fluid theft prevention system of claim 1, wherein the first activity data comprises video data or audio data of the activity near the fluid tank, and the determining the first confidence value comprises at least one of:
    determining that a body near the fluid tank is a human;
    determining that an object near the fluid tank is a tool from among one or more predetermined tools;
    determining a distance between a body and the fluid tank;
    determining a period of time that a body is within a set region around the fluid tank;
    analyzing one or more body movement patterns of video data;
    analyzing one or more sound patterns of audio data; or
    determining whether a fluid cap is disengaged from the fluid tank.

5. The fluid theft prevention system of claim 4, wherein the first activity data comprises video data, and the method further comprises:
    receiving, from a second sensing system, data about motion detection near the fluid tank;
    determining, based on the data about the motion detection, a second confidence value indicative of whether the motion detection is suspicious; and
    turning on a camera of the first sensing system to obtain the video data when the second confidence value exceeds a second confidence threshold value.

6. The fluid theft prevention system of claim 1, wherein the at least one mitigation action comprises at least one of:
    activating a sound horn of the vehicle;
    causing an alarm system to emit an alarm comprising sound or light; or
    transmitting an alert signal to a driver device, to a fleet manager system, or a security service system.

7. The fluid theft prevention system of claim 1, wherein the method further comprises:
    causing a first mitigation action to be taken when the first confidence value exceeds a first confidence threshold value; and
    causing a second mitigation action to be taken when the fluid level decreases by the threshold amount, the second mitigation action being different than the first mitigation action.

8. The fluid theft prevention system of claim 1, wherein the fluid tank is a fuel tank.

9. A fluid theft prevention system for a vehicle, the fluid theft prevention system comprising:
    at least one processor; and
    a memory, operatively connected to the at least one processor and storing instructions that, when executed by the at least one processor, cause the system to perform a method, the method comprising:

receiving, from a sensing system, first activity data about activity near a fluid tank of the vehicle;

determining, based on the first activity data, a first confidence value indicative of whether the activity is suspicious;

receiving fluid data indicative of a fluid level in the fluid tank;

receiving location information of a driver identity device;

determining, based on the location information, whether the driver identity device is in proximity with the vehicle;

causing:
- a first mitigation action to be taken when the first confidence value exceeds a first confidence threshold value and the driver identity device is not in proximity with the vehicle; and
- the at least one mitigation action to not be taken when the first confidence value exceeds the first confidence threshold value and the driver identity device is in proximity with the vehicle; and causing, based on the first activity data and the fluid data, a second mitigation action to be taken when the fluid level decreases by a threshold amount, the threshold amount comprises a first amount when the first confidence value exceeds the first confidence threshold value and a second amount when the confidence value is below the first confidence threshold value, and wherein the second amount is more than the first amount.

10. The fluid theft prevention system of claim 9, wherein the method comprises causing:
the second mitigation action to be taken when the fluid level decreases by the threshold amount and the driver identity device is not in proximity with the vehicle; and
the second mitigation action to not be taken when the fluid level decreases by the threshold amount and the driver identity device is in proximity with the vehicle.

* * * * *